United States Patent
Reis et al.

(10) Patent No.: US 11,102,990 B2
(45) Date of Patent: Aug. 31, 2021

(54) KEEL STRIP REMOVAL APPARATUS AND METHOD

(71) Applicant: Prime Equipment Group, LLC, Columbus, OH (US)

(72) Inventors: Kirk Reis, Columbus, OH (US); Stephen Cribb, Columbus, OH (US); Barry Jones, Columbus, OH (US)

(73) Assignee: PRIME EQUIPMENT GROUP, LLC, Columbus, OH (US)

( * ) Notice: Subject to any disclaimer, the term of this patent is extended or adjusted under 35 U.S.C. 154(b) by 0 days.

(21) Appl. No.: 16/835,767

(22) Filed: Mar. 31, 2020

(65) Prior Publication Data
US 2020/0323224 A1    Oct. 15, 2020

Related U.S. Application Data

(60) Provisional application No. 62/831,948, filed on Apr. 10, 2019.

(51) Int. Cl.
*A22C 21/00* (2006.01)
*A22C 21/06* (2006.01)

(52) U.S. Cl.
CPC .......... *A22C 21/06* (2013.01); *A22C 21/0053* (2013.01)

(58) Field of Classification Search
CPC ...... A22C 21/00; A22C 21/06; A22C 21/0053
USPC .................................. 452/148–153, 160–162
See application file for complete search history.

(56) References Cited

U.S. PATENT DOCUMENTS

| | | | | |
|---|---|---|---|---|
| 3,722,032 A | * | 3/1973 | Draper ............... | A22C 21/0069 452/140 |
| 4,306,335 A | * | 12/1981 | Hawk ................ | A22C 21/0023 452/165 |
| 5,035,673 A | * | 7/1991 | Hazenbroek ....... | A22C 21/0023 452/149 |

(Continued)

FOREIGN PATENT DOCUMENTS

| EA | 033203 B1 | 11/2016 |
|---|---|---|
| EP | 0 678 243 A1 | 10/1995 |

(Continued)

OTHER PUBLICATIONS

Search Report and Preliminary Assessment dated Sep. 3, 2020, in PL Application No. P.433454 filed Apr. 6, 2020, 16 pages.

*Primary Examiner* — Richard T Price, Jr.
(74) *Attorney, Agent, or Firm* — Christensen O'Connor Johnson Kindness PLLC

(57) ABSTRACT

An apparatus and method to remove a keel strip that is centrally attached to a poultry butterfly. The butterfly has first and second poultry breasts on opposite sides of the keel strip. An elongated, longitudinally-oriented spine defines a butterfly travel path and is disposed above a longitudinally-driven conveyor. A scoring blade is disposed above, and spaced a predetermined distance from, the spine. First and second severing blades are disposed along the butterfly travel path downstream of the scoring blade with the first and second severing blades disposed on opposing first and second lateral sides of the spine. A second longitudinally-driven conveyor is disposed above the spine and extends from a first position downstream of the scoring blade to at least a second position between the first and second severing blades.

14 Claims, 7 Drawing Sheets

(56) References Cited

U.S. PATENT DOCUMENTS

| | | | | |
|---|---|---|---|---|
| 5,147,240 | A | * | 9/1992 | Hazenbroek ....... A22C 21/0023 452/160 |
| 5,336,127 | A | * | 8/1994 | Hazenbroek ....... A22C 21/0023 452/160 |
| 5,370,573 | A | | 12/1994 | Warren et al. |
| 5,545,083 | A | | 8/1996 | Bargele et al. |
| 7,341,505 | B1 | * | 3/2008 | Gasbarro ........... A22C 21/0023 452/169 |
| 7,452,266 | B2 | * | 11/2008 | Bottemiller .............. A22C 7/00 452/150 |
| 7,662,031 | B1 | * | 2/2010 | Gasbarro ........... A22C 21/0061 452/130 |
| 2020/0323224 | A1 | * | 10/2020 | Reis .................. A22C 21/0069 |

FOREIGN PATENT DOCUMENTS

| | | |
|---|---|---|
| EP | 3 062 620 B1 | 3/2018 |
| WO | 2019/185155 A1 | 10/2019 |

\* cited by examiner

KEEL STRIP REMOVAL APPARATUS AND METHOD

CROSS-REFERENCE TO RELATED APPLICATION

This application claims the benefit of U.S. Provisional Application No. 62/831,948, filed Apr. 10, 2019, the entire contents of which are incorporated herein by reference in their entirety.

BACKGROUND

The invention relates to machines and processes for removing consumable muscle and other products from poultry and other animals, and more particularly to machines and processes for removing the keel strip from between the breasts of poultry.

A poultry keel is an extension of the sternum (breastbone) and extends axially along the sternum, perpendicular to the plane of the ribs. The keel is cartilaginous and attaches to the sternum. The poultry breast muscle attaches to the sternum at the junction of the breasts, and the keel strip is the portion of the keel that is substantially integrated with the breast muscle. In turkeys and in other birds, the keel strip cannot be readily removed from the breast muscle simply by pulling or with a single cut when the muscle is raw (uncooked). This is because of how the breast muscle and the keel strip are integrated. Thus, there is no way to remove the keel strip entirely from the breast muscle except for precise manual removal.

Historically keel strip removal has been performed manually, such as by a human carefully slicing the keel strip away from the breast muscle using a hand-held knife. This is an operation that includes risk of injury, and requires skill even when the operator leaves leave a small amount of muscle on the keel strip. Food processing machines can operate at higher speeds, with greater predictability and accuracy, but machines have not been developed that can precisely remove all keel from the muscle without loss of muscle. Machines have been developed that remove large sections of the keel from the skeleton of poultry at high speed and/or at high volume. However, such machines do not accurately and efficiently remove the keel strip from the breast muscle. One example of a prior art machine is made by Cooper Farms, and has two parallel disc blades on a single driveshaft. The keel strip is transported along a vertically-oriented strip to a conveying mechanism, such as an upwardly-facing sticker chain spaced from a parallel member, that drives the keel strip into the two disc blades. Prior art machines either leave too much keel on the muscle or leave too much muscle on the keel.

There is a need for a keel-strip removing apparatus and method that removes the keel efficiently from the breast muscle and reduces or eliminates injury risk to humans.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An apparatus is disclosed for removing a keel strip that is centrally attached to a butterfly. The butterfly is defined by first and second poultry breasts on opposite sides of the keel strip. The apparatus comprises an elongated, longitudinally-oriented spine that defines a butterfly travel path and is disposed above a first longitudinally-driven conveyor. A scoring blade has an edge disposed above, and spaced a predetermined distance from, the spine. The scoring blade forms a scoring gap between the spine and the scoring blade edge through which the butterfly may pass. First and second severing blades are disposed along the butterfly travel path downstream of the scoring blade. The first severing blade is disposed on a first lateral side of the spine, and the second severing blade is disposed on a second, opposite lateral side of the spine.

In one embodiment, a second longitudinally-driven conveyor is disposed above the spine. The second conveyor extends from a first position downstream of the scoring blade to at least a second position between the first and second severing blades. In another embodiment, the first conveyor extends downstream beyond the first position.

In another embodiment, a finger extends into a path of the second conveyor for removing the keel strip from the second conveyor. In another embodiment, the spine comprises a first butterfly-supporting surface that faces the first severing blade, and a second butterfly-supporting surface that is transverse to the first butterfly-supporting surface and faces the second severing blade.

In one embodiment, the first butterfly-supporting surface has a first aperture into which the first severing blade extends, and the second butterfly-supporting surface has a second aperture into which the second severing blade extends. The spine may be V-shaped in cross-section, and the first and second surfaces may be disposed at an angle between about 30 degrees and about 100 degrees. The first and second severing blades are contemplated to be disposed at an angle between about 20 degrees and about 90 degrees. In one embodiment, a downstream portion of the first conveyor is positioned lower than an upstream portion of the first conveyor to form a lower surface.

A method is disclosed for removing a keel strip centrally attached to a butterfly. The butterfly is defined by first and second poultry breasts on opposite sides of the keel strip. The method comprises disposing the keel strip of the butterfly on a spine. The butterfly is conveyed along the spine with a first conveyor disposed beneath the spine to at least a scoring blade spaced above the spine. The keel strip is scored using the scoring blade. The butterfly is conveyed along the spine with a second conveyor disposed above the spine to first and second severing blades. The first severing blade is disposed on a first lateral side of the spine and the second severing blade disposed on a second, opposite lateral side of the spine. The first severing blade severs the first breast from the keel strip and the second severing blade severs the second breast from the central keel strip.

In one embodiment the method further comprises removing the central keel strip from the second conveyor. In one embodiment, the first conveyor ceases conveying the butterfly downstream of the scoring blade. The breasts of the butterfly hang downwardly from the keel strip on opposite sides of the spine downstream of the scoring blade, thereby falling downwardly therefrom after the severing step. In one embodiment, the method further comprises extending the first and second severing blades through corresponding first and second apertures on opposite lateral sides of the spine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
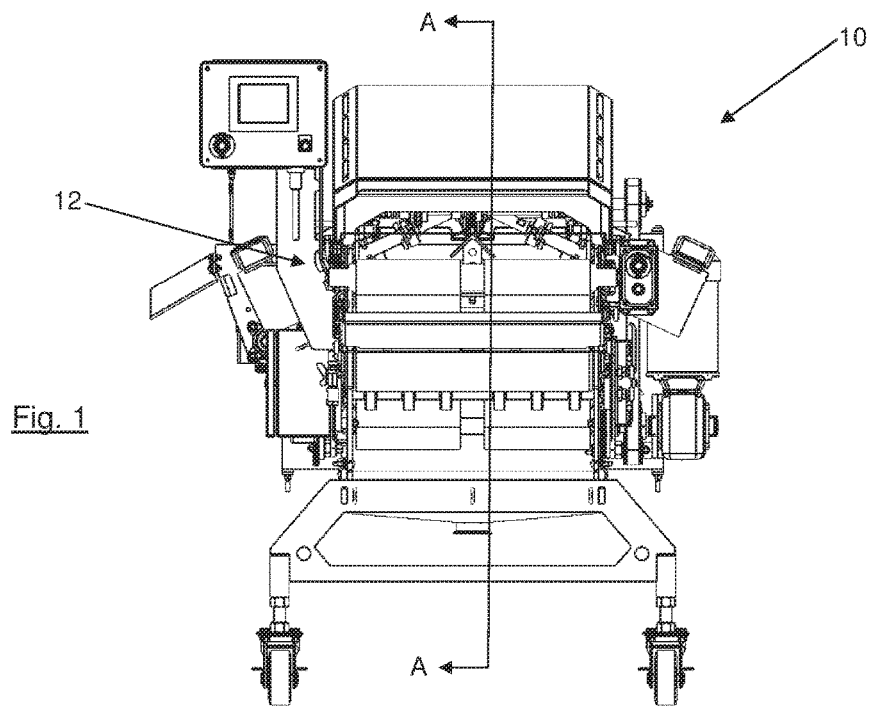
FIG. 1 is a front view illustrating an entry end of an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION

The apparatus 10 has a rigid frame that may be made of stainless steel or any other suitably rigid and food-safe material, and to which numerous components attach, for providing a foundation for the apparatus 10. The frame may have feet, legs, wheels and any other structures that rest on the floor surface of a factory to permit stable use of the apparatus 10, possibly along with movement of the apparatus 10 along the surface upon which it rests until reaching a desired location. The apparatus 10 may be used in a poultry processing plant, and may be placed near other machines that act upon poultry carcasses or components of poultry carcasses, such as by cutting, skinning, moving or otherwise processing the carcasses or components thereof. For example, the apparatus 10 may be placed in series with other machines that the poultry carcasses or components are moved along to progressively perform actions on the carcasses or components to subdivide the carcass into marketable poultry components, including, without limitation, wings, breasts, legs, and thighs.

Figure 2:
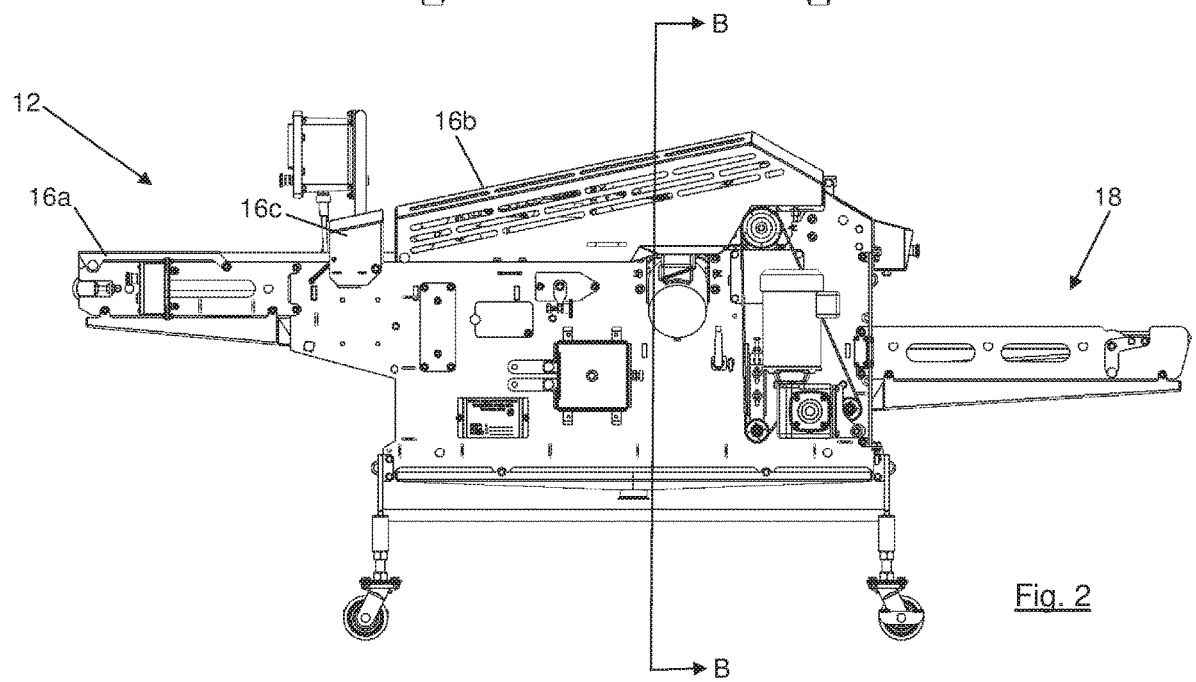
FIG. 2 is a right side view illustrating the embodiment of FIG. 1.
Figure 13:
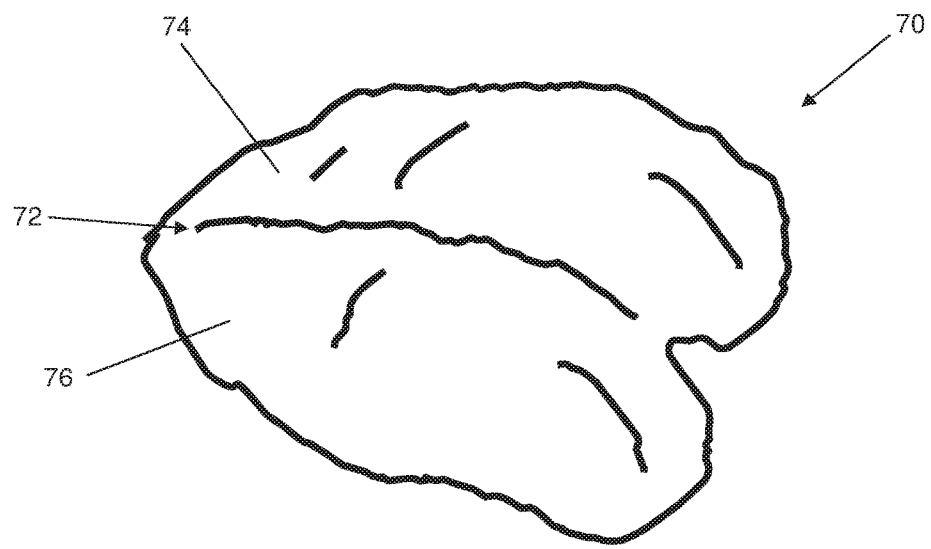
FIG. 13 is a schematic view in perspective illustrating a butterfly.

Poultry components to be acted upon by the apparatus 10 may be placed on the entry end 12, which is shown in the foreground in FIG. 1 and on the left in FIG. 2, but this location is not critical. The poultry components upon which the apparatus 10 operates may be the still-joined breasts of a poultry (e.g., chicken, turkey, Cornish hen, grouse, quail, or any other bird) carcass. Such still-joined poultry breasts may be referred to as a "butterfly" 70 and are made up of two poultry breasts 74 and 76. Depending upon how the still-joined breasts were removed from the carcass, there may be cartilage or another membrane that is part of the poultry keel prior to removal of the butterfly from the carcass. The cartilage or other membrane is referred to as the "keel strip" 72 once the butterfly is separated from the carcass. An example of a butterfly 70 is shown in FIG. 13 with the breast lobes 74 and 76 joined together with the keel strip 72 therebetween.

Figure 5:
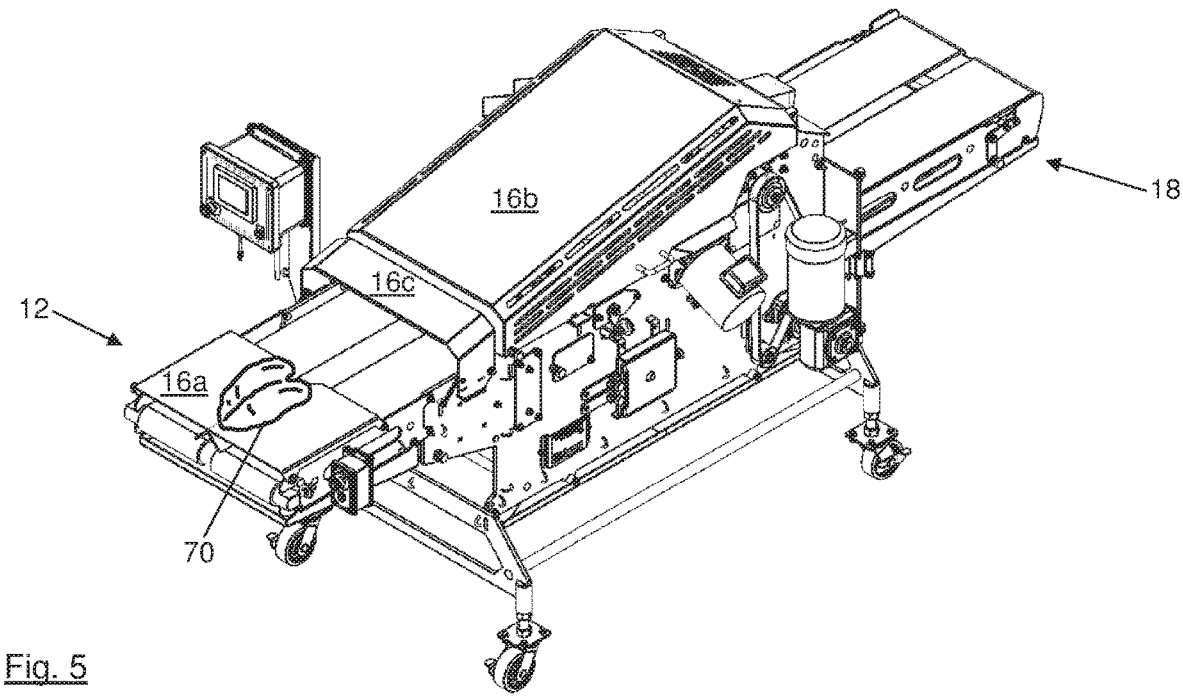
FIG. 5 is a view in perspective illustrating the embodiment of FIG. 1.

One or more butterflies 70 may be disposed on the conveyor 20 at the entry end 12, as illustrated in FIG. 5. The butterflies may be placed with the skin side down (contacting the conveyor 20), and the side that was positioned closest to the shoulder, before removal from the carcass, facing downstream. Removal of butterflies from the poultry carcasses may be carried out upstream of the apparatus 10 (toward the left in FIG. 2) by a person manually removing them or by a machine or a combination. A person or a mechanism, such as a robot or another conveyor, may load each of the butterflies on the entry end 12. The conveyor 20, which may be a conventional conveyor belt and associated drive mechanisms, may displace butterflies longitudinally downstream from the entry end 12 toward the exit end 18.

Figure 3:
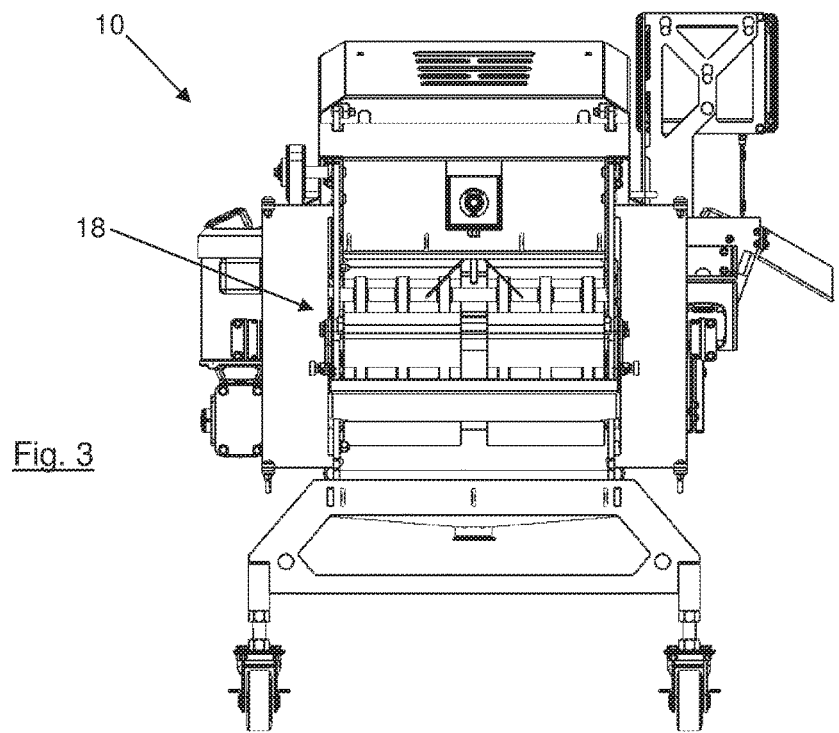
FIG. 3 is a rear view illustrating an exit end of the embodiment of FIG. 1.

Once each butterfly has been acted upon by the apparatus 10, as described in detail below, the component parts of the butterfly are conveyed out of the apparatus's exit end 18, which is in the foreground in FIG. 3 and on the left in FIG. 4. The component parts of butterflies are two breasts and a central portion that contains the keel strip, typically with some breast muscle attached thereto. The apparatus thus receives a butterfly at the entry end 12, separates it into these component parts and moves it toward the exit end 18 where it exits the apparatus 10 as these component parts.

The apparatus 10 has a plurality of safety devices, such as the shields 16a and 16b, and a brake plate 16c, that are shown in FIGS. 1-6, but are not visible in other illustrations. These devices have been removed from, for example, the illustration of FIG. 7 in order to better view the internal structures of the apparatus 10 that are described herein. These safety devices are known to persons of ordinary skill in machines of this type.

Figure 4:
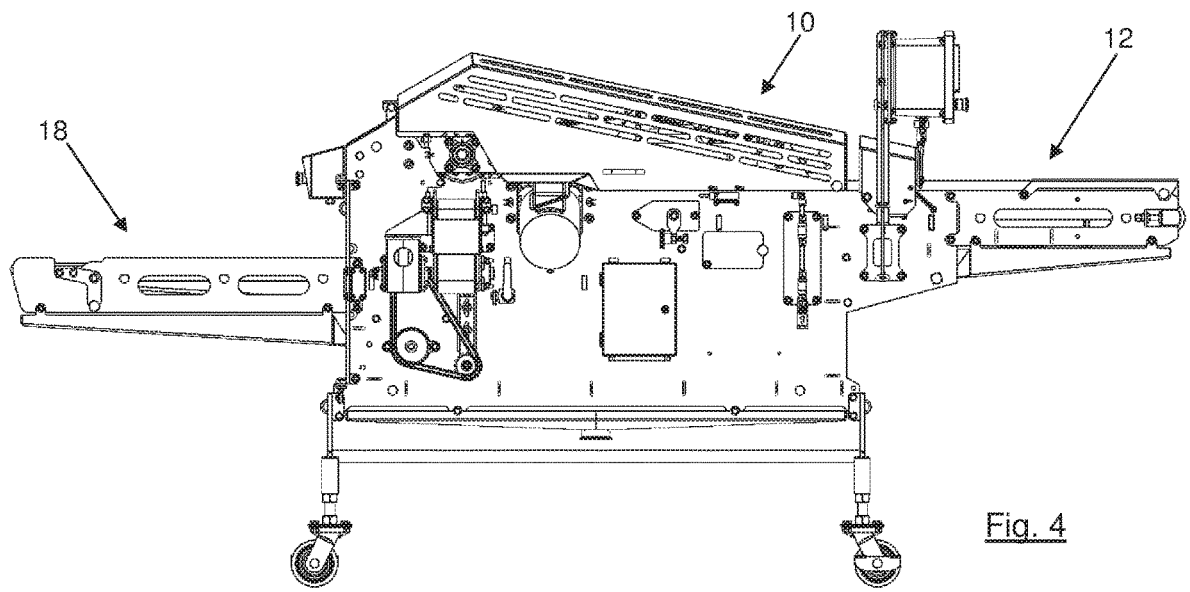
FIG. 4 is a left side view illustrating the embodiment of FIG. 1.
Figure 6:
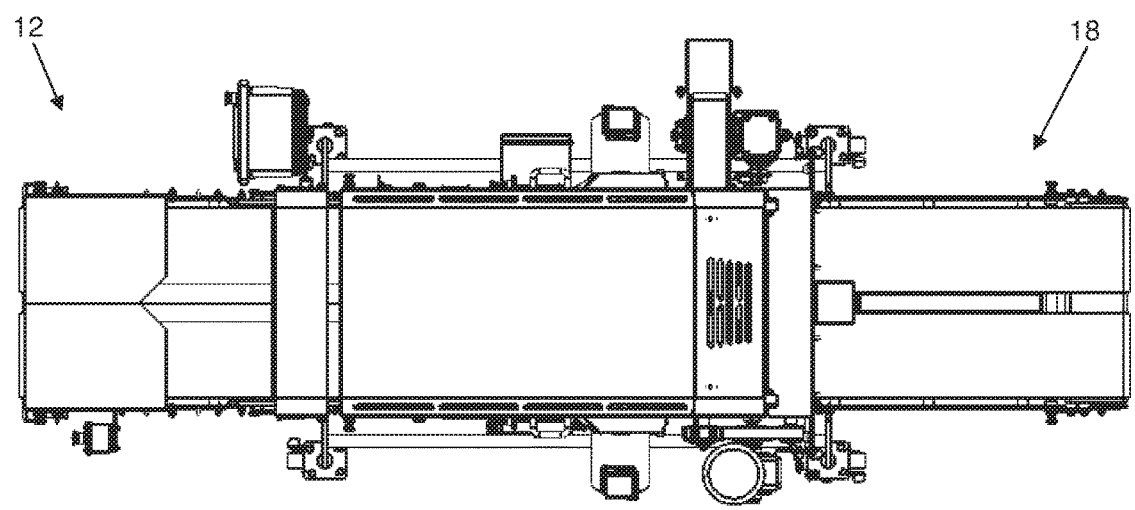
FIG. 6 is a top view illustrating the embodiment of FIG. 1.
Figure 7:
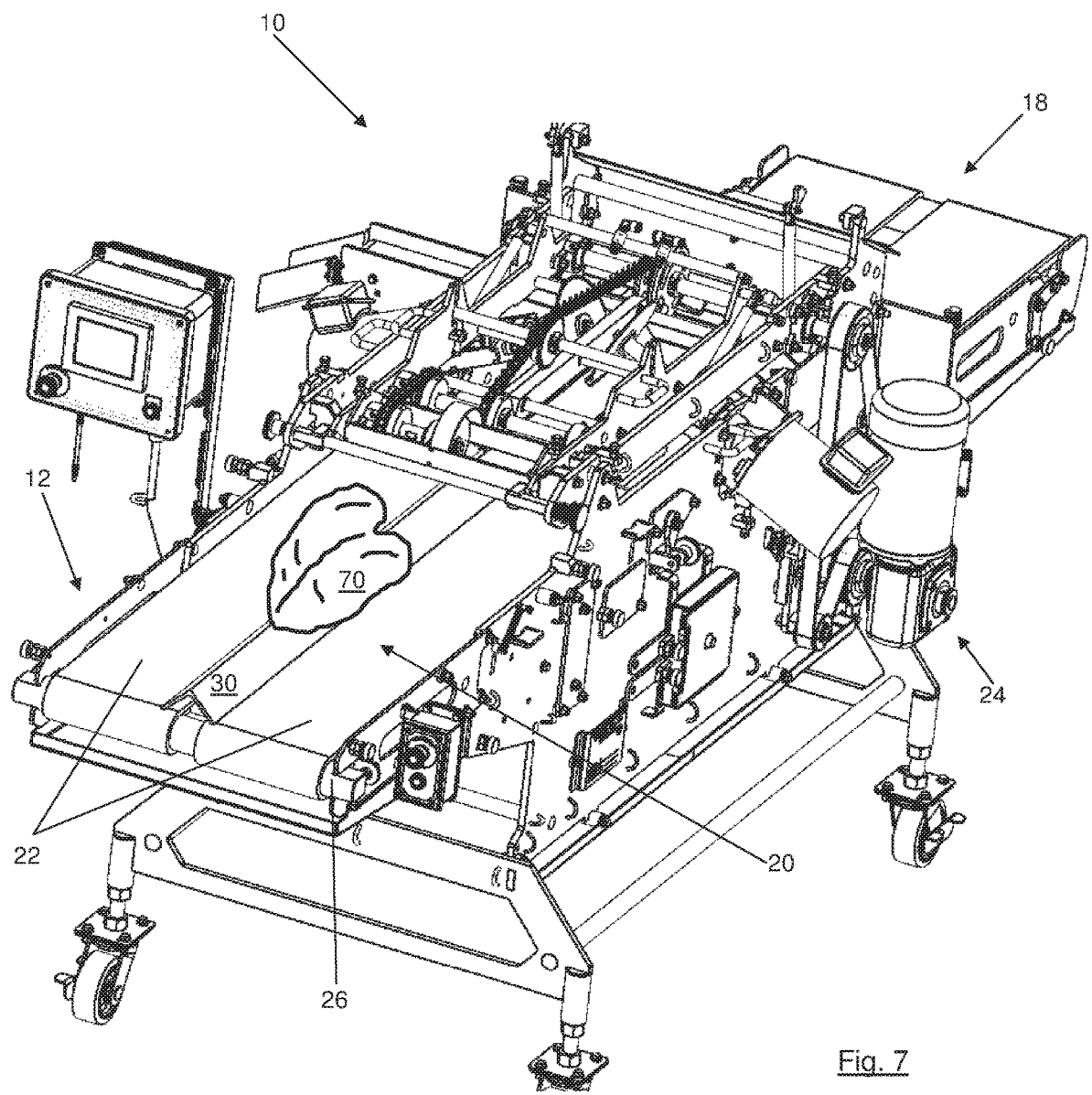
FIG. 7 is a view in perspective illustrating the embodiment of FIG. 1 with some safety shields and other structures removed for better visibility.

The longitudinal direction of the apparatus 10 is along the length of the apparatus 10, and the movement of the butterflies is from upstream to downstream along the longitudinal direction, which is from left to right in the views of FIGS. 2 and 6, and from right to left in FIG. 4. As shown in FIG. 7, the longitudinally-driven conveyor 20 extends and moves downstream from the entry end 12 toward the exit end 18 along at least a portion of the length of the apparatus 10. The conveyor 20 may include one or more conventional conveyor belts 22 that are driven by a conventional rotary motor, such as the servomotor 24, around an idler roller 26 and other conventional components for driving the belts 22. The belts may be nub-top belting that is known in the industry. The conveyor 20 may drive a butterfly or other poultry component resting thereupon along a portion of the length of the apparatus 10. In the embodiment shown in FIG. 7, the conveyor 20 conveys a butterfly 70 from the entry end 12, which is in the foreground, toward the exit end 18, which is in the background.

An elongated, longitudinally-oriented spine, which may be the inverted, V-shaped bar 30, is rigidly mounted to the frame of the apparatus 10 and disposed substantially parallel to the belts 22 above the conveyor 20. The bar 30 may cover a lateral gap between the belts 22 through which fasteners extend to fix the bar 30 to the frame of the apparatus 10, and may define a travel path for each butterfly passing through the apparatus 10. The shield 16a, which may pivotably mount to the frame of the apparatus 10 near lateral edges (see FIG. 5), may be disposed directly above the upstream end of the bar 30. The shield 16a may provide an upwardly-facing surface that permits a person using the apparatus 10 to rest a butterfly on wherein the keel strip is aligned along the longitudinal axis of the bar 30. The person may then manually, such as with his or her hands, push the butterfly 70 longitudinally along the shield 16a onto the bar 30 as shown in the position of FIG. 7 (with the shield 16a removed). The keel strip 72 may stay aligned with, and rest upon the vertical apex of, the bar 30 as the butterfly is displaced off the ends of the shield 16a and along the bar 30. In a preferred embodiment, the butterfly self-aligns or centers itself on spine due to its weight on the angled bar 30. The breast lobes 74 and 76 of the butterfly may be positioned on opposite lateral sides of the keel strip and may rest upon the belts 22 after the butterfly 70 is displaced off the shield 16a. When the conveyor 20 is moving and the breast lobes are in their respective positions on the belts 22, the butterfly 70 is conveyed downstream by the belts 22 while maintaining the keel strip on the apex of the bar 30.

Figure 8:
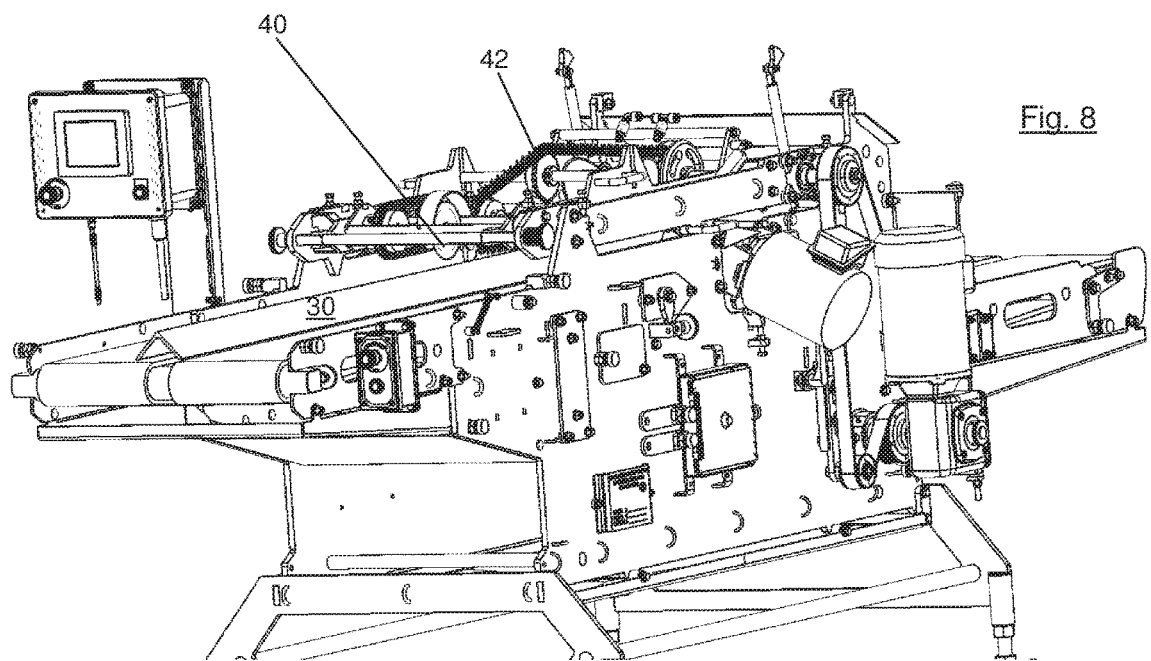
FIG. 8 is a side view in perspective illustrating the embodiment of FIG. 7.
Figure 9:
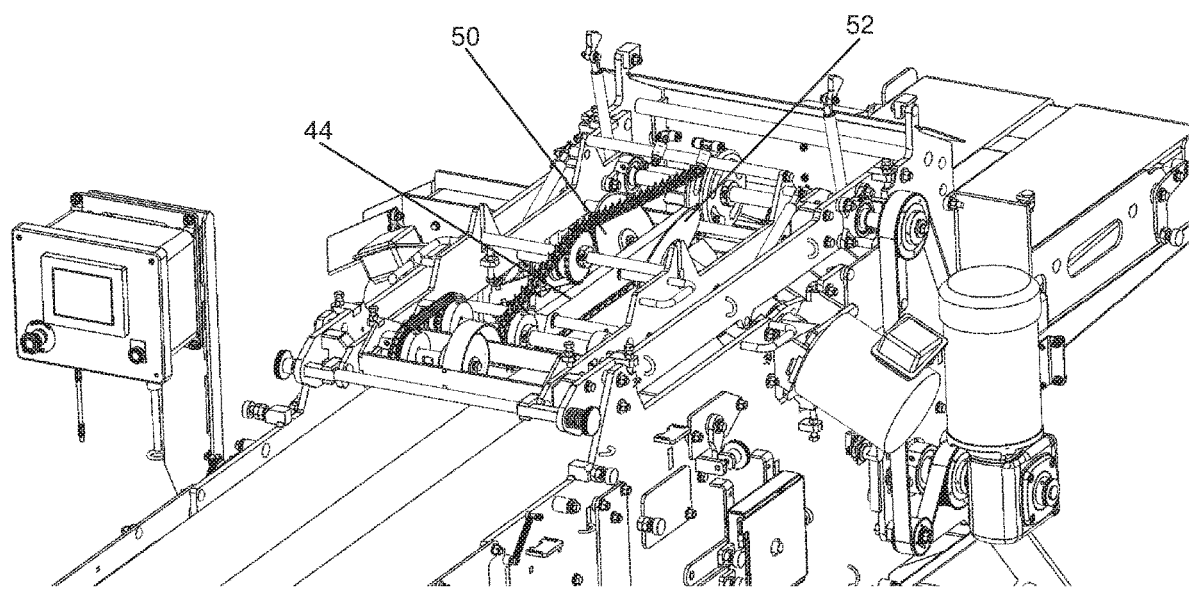
FIG. 9 is a view in perspective illustrating the embodiment of FIG. 8 at higher magnification.

As shown in FIG. 8, the bar 30 extends under a scoring blade, which may be a rotating wheel 40 with a sharpened peripheral edge that is driven to rotate at about the same speed as the conveyor belts 22. As a butterfly moves through a scoring gap between the apex of the bar 30 and the peripheral edge of the wheel 40, the wheel 40 makes a shallow incision or impression in the keel strip to weaken the keel strip's ability to support the breast lobes against a lateral and/or vertical force. The wheel 40 may compress the keel to weaken it further. This weakening allows the breast lobes of the butterfly to extend downwardly, under the force of gravity, downstream from the wheel 40 as described below. The motor 24 may drive the wheel's 40 lower peripheral edge at about the same speed as the conveyor 20 or at another speed, and in the same direction.

After being conveyed along the bar 30 downstream from the wheel 40, the butterfly reaches a second longitudinally-driven conveying device, which may be a sticker chain 42 that is driven longitudinally along the apparatus 10 by a motor, sprockets and idler wheels. The sticker chain 42 is a conventional mechanism known to the person of ordinary skill to have a plurality of rigid links pivotably mounted to adjacent links in series forming a chain, wherein at least one side of at least some of the links has sharp, protruding teeth. When driven in contact with poultry components, the sticker chain's teeth puncture the flesh, thereby permitting the driven chain to drive the components at the same rate as the chain. The motor driving the sticker chain 42 may be the same motor 24 that drives the conveyor 20 and the wheel 40. Any conveying structure that is capable of moving a butterfly downstream will suffice.

A lower span of the sticker chain 42 is conveyed above and substantially parallel (preferably horizontally and vertically) to the bar 30 and extends its sharp teeth, which are pointed substantially downwardly, into contact with the butterfly, and preferably the portion of the butterfly where the keel strip, and immediately-adjacent muscle, are located. The sticker chain 42 may only puncture a central portion of butterflies, and specifically that central portion that that includes the keel strip and the immediately-adjacent (e.g., within one eighth inch to one half inch of each opposing lateral edge of the keel strip) muscle that will later be separated from the breast lobes as described below. This leaves the breast lobes with no puncture marks, and securely retains the butterfly during its movement along the apparatus 10, as described below.

Figure 10:
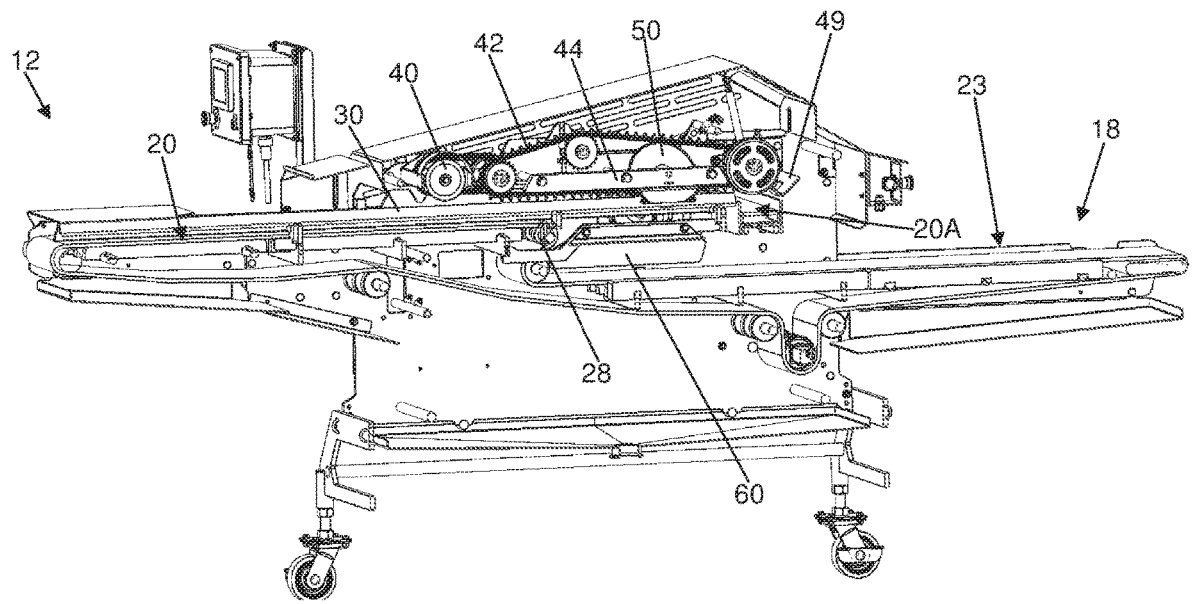
FIG. 10 is a side view in section illustrating the embodiment of FIG. 1 through the line A-A.

As shown in FIG. 10, a longitudinally-oriented support beam 44 is mounted to the frame, directly or through other members, and is disposed directly above the lowest span of the sticker chain 42, which is directly above the bar 30. Preferably the support beam 44 is immobile under the forces that are applied to it in normal use, and has a downwardly-facing surface that is substantially parallel to the apex of the bar 30. In this configuration, a butterfly may be pushed and/or pulled in a downstream direction, such as by the conveyor 20 and/or the sticker chain 42, into the gap between the bar 30 and the lowest span of the sticker chain 42.

It is preferred that the sharp tips of the lowest span of the sticker chain 42 teeth are spaced from the bar 30 by a gap that is no larger, and preferably slightly smaller, than about the thickness of any butterfly that the apparatus 10 will encounter. This distance may be adjustable for variations in butterfly thickness, which encourages the teeth of the sticker chain 42 to puncture the butterfly. The lowest span of the sticker chain 42 may seat its upwardly-facing backbone against the downwardly-facing surface of the support beam 44 to prevent the lowest span from being pushed farther upward than the downwardly-facing surface of the support beam 44. The support beam 44 thus limits the upward movement of the lowest span of the sticker chain 42. In this manner, for a butterfly of thickness greater than the gap between the bar 30 and the sharp tips of the teeth of the sticker chain 42, the sticker chain's downwardly-directed teeth penetrate into a butterfly interposed into this gap. This puncture engagement prevents subsequent relative longitudinal and/or lateral movement between the sticker chain 42 and the butterfly, thereby ensuring that the butterfly is conveyed downstream along the bar 30 at the same rate as the sticker chain 42.

As shown in the sectional view of FIG. 10, the conveyor 20 extends longitudinally downstream from the entry end 12 to at least the wheel 40. Just downstream of the wheel 40 is the upstream end of the sticker chain 42. Downstream of the wheel 40, and preferably between the upstream and downstream ends of the sticker chain 42, the severing blades 50 and 52 are disposed to sever the breast lobes from the keel strip, as described in more detail below. Between the upstream end of the sticker chain 42 and the severing blades 50 and 52, the conveyor 20 may depart vertically from the bar 30, such as by forming a lower surface 23 that is spaced substantially farther from the apex of the bar 30 than the b conveyor belts 22 at the entry end 12. In one embodiment, the idler roller 28 (around which the belts 22 extend to depart vertically downwardly) is rotatably mounted to the frame downstream from the wheel 40 and upstream from the severing blades 50 and 52. The conveyor belts 22 continue around the roller 28 and extend downwardly to a lower position where they form the lower surface 23 and continue longitudinally toward the exit end 18.

Once each butterfly begins to be conveyed by the sticker chain 42, the upward support by the conveyor 20 of the lobes of the butterfly becomes unnecessary because the sticker chain 42 prevents lateral and/or longitudinal movement of the butterfly. This permits the breast lobes of the butterfly, which comprise the poultry breasts once separated from the central portion, to hang downwardly on either side of the bar 30 after they pass downstream of the roller 28, because of the lower positioning of the lower surface 23 than the conveyor belts 22. Each breast lobe may hang with little or no vertical support, other than the sticker chain 42, thereby applying an equal downward force on opposite sides of the keel strip, and on opposite sides of the bar 30. This downward force on opposite sides of the bar 30, with the keel strip substantially aligned along the apex of the bar 30, applies a lateral force to opposite sides of the keel strip. The wheel 40 previously indented and/or formed a small slit in the keel strip, thereby causing the opposing lateral forces applied by the lobes to spread the keel strip laterally by drawing the muscle farther away from the central portion of the butterfly. Because of the opposing lateral forces on the keel strip by the breast lobes, the muscle attached to the keel strip is drawn away from the keel strip so that less muscle is in the central portion directly adjacent the keel strip. Therefore, as described below, more muscle is severed from the keel strip and less muscle is left in the central portion when incisions are formed on opposite lateral sides of the keel strip. Less muscle is thereby lost by remaining on the keel strip.

The motors 50m and 52m are mounted to the frame of the apparatus 10 and the driveshafts thereof are free to spin in a conventional manner. The motors 50m and 52m may be electric rotary motors, pneumatic motors or any other rotary prime mover. The blades 50 and 52, which are preferably 7.5 inch diameter disks made of steel or another equivalent material, are rigidly mounted to the respective driveshafts of the motors 50m and 52m so each respective sharpened peripheral edge is disposed in the path of travel of the butterflies, preferably on opposite sides of the bar 30. The planes of the disk-shaped severing blades 50 and 52 may be angled laterally to one another. The angle between the blades may be about 50 degrees, but is contemplated to be within a range between about 30 degrees and about 120 degrees. In a preferred embodiment, the blades 50 and 52 are at the same longitudinal position of the apparatus 10, but it is contemplated that they may be spaced longitudinally.

Figure 12:
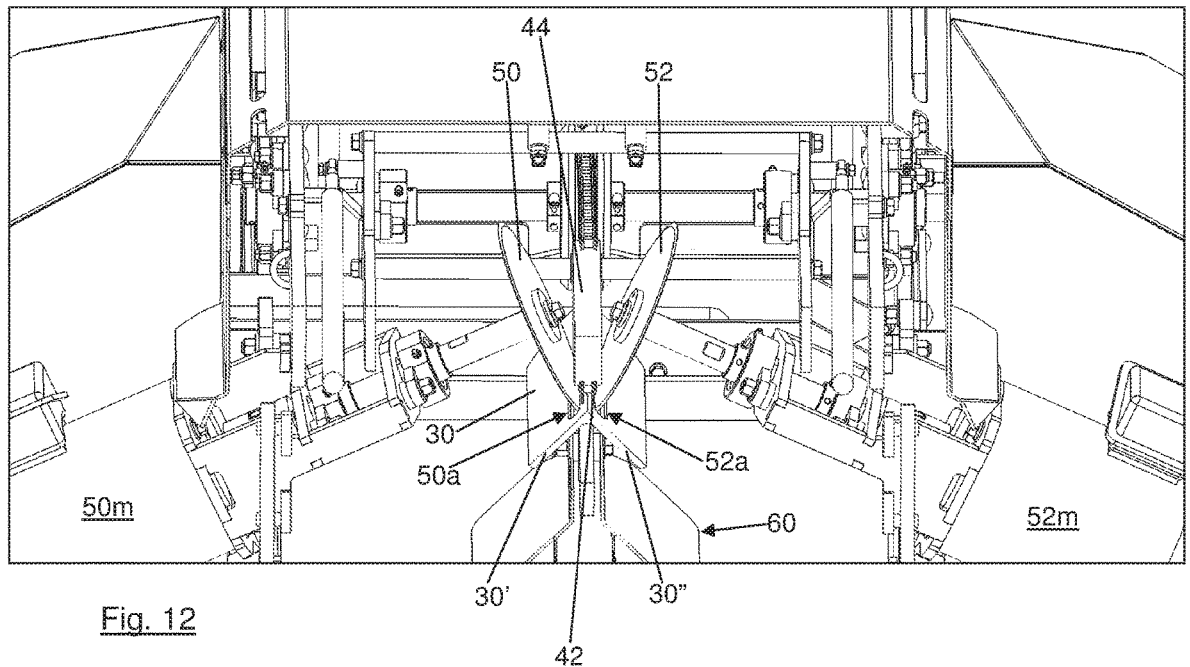
FIG. 12 is a magnified view of the region inside the rectangle designated C in FIG. 11.

As shown in FIG. 12, the blades 50 and 52 extend through apertures 50a and 52a, respectively, formed in the bar 30. The apertures 50a and 52a are elongated to permit the peripheral edges of the blades 50 and 52 to extend through the sidewalls 30' and 30" that form the legs of the V-shaped bar 30. Each of the sidewalls 30' and 30" defines a butterfly supporting surface that faces a respective one of the blades 50 and 52. In one embodiment, the sidewalls 30' and 30" are transverse, and may be at an angle of about 90 degrees, but it is contemplated that these sidewalls 30' and 30" may be angled between about 30 degrees and 120 degrees. Each of the blades 50 and 52 may be at a right angle to the respective one of the sidewalls 30' and 30" of the bar 30 through which the blade extends, but this is not essential.

It is contemplated that the motors 50m and 52m may drive the respective blades 50 and 52 in directions that cause both blades to move downwardly on the upstream side thereof. The blades 50 and 52 thus rotate with their top edges moving in an upstream direction and their bottom edges moving in a downstream direction. This rotational direction urges the muscle of the butterfly downwardly against the sidewalls 30' and 30" of the bar 30 in which the apertures are formed, thereby causing the bar 30 to serve as an anvil. This aids in completely cutting the skin on the butterfly. Thus, as the sticker chain 42 conveys each butterfly from first contact with the blades 50 and 52 and further downstream, the butterfly is pushed against the bar 30 by the blades 50 and 52 during cutting to ensure complete severing of the breast lobes from the center portion that contains the keel strip. Once each butterfly's leading edge reaches the portion of the blades 50 and 52 directly below the driveshafts, the upward movement of the blades downstream of the driveshafts does not negatively affect the process.

As each butterfly's leading edge moves downstream of the blades 50 and 52, each center portion, containing the keel strip and a small amount of muscle, is completely severed from the opposing breast lobes, thereby permitting the latter to fall downwardly onto the lower surface 23 and be conveyed toward the exit end 18 of the apparatus 10. Each center portion remains between the sticker chain 42 and the support beam 44 until it reaches the end of the sticker chain 42, where a removal device is positioned near the most downstream sprocket around which the sticker chain 42 extends. The removal device 49 may be a cantilevered finger 49 that extends from the frame into the path of the sticker chain 42 to displace center portions away from the sticker chain 42, thereby causing the center portions to fall downwardly onto an awaiting conveyor 20A (FIG. 10), which may convey the center portions laterally of the apparatus 10.

A plurality of butterflies may be placed on the entry end 12, preferably one at a time. A person or a mechanism manually or automatically conveys each butterfly onto the bar 30 in a series, preferably with longitudinal spacing of a few inches or more between adjacent butterflies. Each butterfly is conveyed along the bar 30 with breast lobes on the belts 22 and the keel strip aligned on the bar's apex. The wheel 40 scores each butterfly that passes beneath and then the sticker chain 42 begins to convey the butterfly. Once a butterfly is between the upstream end of the sticker chain and the blades, preferably about midway, the breast lobes begin hanging downwardly on either side of the bar 30. The position where the breasts begin hanging may be just downstream of the roller 28. The opposing forces applied to the keel strip by the freely hanging breasts cause the muscle attached to the keel strip to spread laterally and pull on the keel strip. This causes a thinning of the keel strip region, whereby less muscle volume is located in the region that will pass between the blades 50 and 52.

Figure 11:
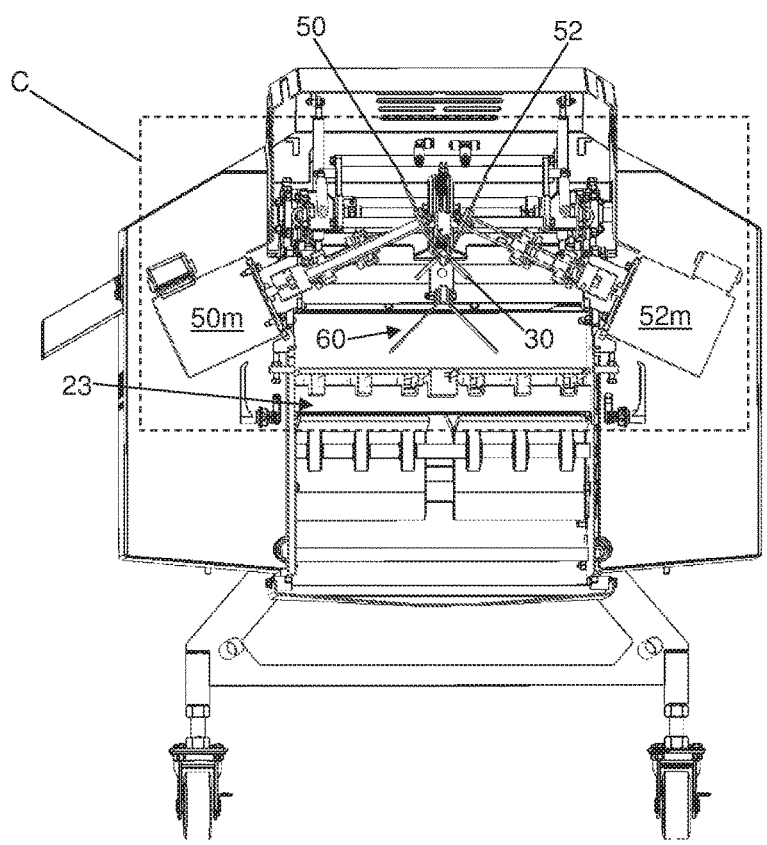
FIG. 11 is an end view in section illustrating the embodiment of FIG. 2 through the line B-B.

When the downstream edges of the butterfly reach the upstream edges of the blades 50 and 52, the blades 50 and 52 cut into the muscle laterally outwardly of the keel strip a small distance, such a fraction of an inch. The thinning of the keel strip region keeps to a minimum the amount of muscle that will remain attached to the keel strip (in the center portion that is separated from the breast lobes) once the severing is completed. As the sticker chain 42 conveys the butterfly into the blades 50 and 52, as is apparent in FIG. 12, the blades 50 and 52 sever the lobes from each side of the butterfly. This leaves the keel strip and a small amount of muscle in the center portion that remains between the blades 50 and 52 and continues to be conveyed by the sticker chain 42 past the blades 50 and 52. The lobes fall downwardly when they are completely severed from the center portion, preferably dropping onto the lower surface 23, which is a continuation of the conveyor 20 on opposite sides of a guide 60 (see FIG. 11) that prevents the lobes from falling inwardly between the belts of the conveyor 20. The center portion that includes the keel strip with a small amount of muscle continues beyond the blades 50 and 52, as guided by the sticker chain 42, and then is removed from the sticker chain 42 closer to the exit end 18. It is preferred that the finger 49 obstructs the sticker chain to the extent that center portions may not pass and are mechanically removed from the sticker chain.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus for removing a keel strip that is centrally attached to a butterfly defined by first and second poultry breasts on opposite sides of the keel strip, the apparatus comprising:
   (a) an elongated, longitudinally-oriented spine that defines a butterfly travel path and is disposed above a first longitudinally-driven conveyor;
   (b) a scoring blade with an edge disposed above, and spaced a predetermined distance from the spine, thereby forming a scoring gap between the spine and the scoring blade edge through which the butterfly may pass; and
   (c) first and second severing blades disposed along the butterfly travel path downstream of the scoring blade, the first severing blade disposed on a first lateral side of the spine, the second severing blade disposed on a second, opposite lateral side of the spine.

2. The apparatus in accordance with claim 1, further comprising a second longitudinally-driven conveyor disposed above the spine and extending from a first position down stream of the scoring blade to at least a second position between the first and second severing blades.

3. The apparatus in accordance with claim 2, further comprising a beam supporting the second conveyor disposed above the spine.

4. The apparatus in accordance with claim 2, wherein the first conveyor extends downstream beyond the first position.

5. The apparatus in accordance with claim 2, further comprising a finger that extends into a path of the second conveyor for removing the keel strip from the second conveyor.

6. The apparatus in accordance with claim 1, wherein the spine further comprises:
   (a) a first butterfly-supporting surface that faces the first severing blade; and
   (b) a second butterfly-supporting surface that is transverse to the first butterfly-supporting surface and faces the second severing blade.

7. The apparatus in accordance with claim 6, wherein the first butterfly-supporting surface has a first aperture into which the first severing blade extends and the second butterfly-supporting surface has a second aperture into which the second severing blade extends.

8. The apparatus in accordance with claim 7, wherein the spine is V-shaped in cross-section, and the first and second surfaces are disposed at an angle between about 30 degrees and about 120 degrees.

9. The apparatus in accordance with claim 7, wherein the first and second severing blades are disposed at an angle between about 30 degrees and about 120 degrees.

10. The apparatus in accordance with claim 7, wherein a downstream portion of the first conveyor is positioned lower than an upstream portion of the first conveyor to form a lower surface.

11. A method of removing a keel strip centrally attached to a butterfly that is defined by first and second poultry breasts on opposite sides of the keel strip, the method comprising:
   (a) disposing the keel strip of the butterfly on a spine;
   (b) conveying the butterfly along the spine with a first conveyor disposed beneath the spine to at least a scoring blade spaced above the spine;
   (c) scoring the keel strip using the scoring blade;
   (d) conveying the butterfly along the spine with a second conveyor disposed above the spine to first and second severing blades, the first severing blade disposed on a first lateral side of the spine and the second severing blade disposed on a second, opposite lateral side of the spine; and
   (e) severing the first breast from the keel strip with the first severing blade and severing the second breast from the central keel strip using the second severing blade.

12. The method in accordance with claim 11, further comprising removing the central keel strip from the second conveyor.

13. The method in accordance with claim 11, wherein downstream of the scoring blade the first conveyor ceases conveying the butterfly and the breasts of the butterfly hang downwardly from the keel strip on opposite sides of the spine, thereby falling downwardly therefrom after the severing step.

14. The method in accordance with claim 11, further comprising extending the first and second severing blades through corresponding first and second apertures on opposite lateral sides of the spine.

* * * * *